(12) United States Patent
Zapanta et al.

(10) Patent No.: US 10,536,858 B2
(45) Date of Patent: Jan. 14, 2020

(54) SPECTRUM SHARING BASED ON SIGNAL-BASED SHARED ACCESS

(71) Applicant: The Aerospace Corporation, El Segundo, CA (US)

(72) Inventors: Laurence F. Zapanta, Cypress, CA (US); Peter G. Kim, Tustin, CA (US); Beau Backus, Bristow, VA (US); James P. Roberts, Valencia, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/729,571

(22) Filed: Jun. 3, 2015

(65) Prior Publication Data
US 2016/0360419 A1   Dec. 8, 2016

(51) Int. Cl.
*H04W 72/00*  (2009.01)
*H04W 16/14*  (2009.01)
*H04W 24/10*  (2009.01)
*H04W 24/02*  (2009.01)

(52) U.S. Cl.
CPC ........ *H04W 16/14* (2013.01); *H04W 24/10* (2013.01); *H04W 24/02* (2013.01)

(58) Field of Classification Search
CPC . H04W 24/02; H04W 24/10; H04W 72/0453; H04W 72/085; H04W 16/14; H04W 24/04; H04W 24/00; H04W 72/082; H04W 88/06
USPC ....... 455/454, 63.1, 114.2, 115.1, 278.1, 296
See application file for complete search history.

(56) References Cited

U.S. PATENT DOCUMENTS

| | | |
|---|---|---|
| 6,961,584 B2 | 11/2005 | Leedom |
| 7,343,173 B2 | 3/2008 | Leedom |
| 7,627,340 B2 | 12/2009 | Leedom |
| 7,958,041 B2 | 6/2011 | Stanforth et al. |
| 8,078,221 B2 | 12/2011 | Leedom |
| 8,155,649 B2 | 4/2012 | McHenry et al. |
| 8,234,208 B2 | 7/2012 | Stanforth et al. |
| 8,249,966 B2 | 8/2012 | Stanforth et al. |
| 8,401,559 B2 | 3/2013 | Leedom |
| 8,502,733 B1 | 8/2013 | Negus et al. |
| 8,700,041 B2 | 4/2014 | Leedom |

(Continued)

OTHER PUBLICATIONS

John P. Holdren, "Realizing the Full Potential of Government-Held Spectrum to Spur Economic Growth", issued on Jul. 2012.

(Continued)

*Primary Examiner* — Khoi H Tran
*Assistant Examiner* — B M M Hannan
(74) *Attorney, Agent, or Firm* — LeonardPatel PC

(57) ABSTRACT

A process for sharing spectrum based on signal based shared access (SSA) includes measuring by a primary wireless system, the quality of a signal of interest (SOI) over a shared spectrum band. The process includes transmitting a signal quality indicator related to an associated action message from the primary wireless system to a second wireless system. The process also includes receiving spectrum usage information by the primary wireless system from the second wireless system. The process further includes determining by the primary wireless system whether the second wireless system complies with spectrum sharing band conditions between the primary wireless system and the second wireless system.

19 Claims, 10 Drawing Sheets

(56) References Cited

U.S. PATENT DOCUMENTS

| | | | |
|---|---|---|---|
| 8,761,792 B2 | 6/2014 | Sennett et al. | |
| 8,831,617 B2 | 9/2014 | Leedom | |
| 9,699,663 B1* | 7/2017 | Jovancevic | H04W 16/14 |
| 2001/0036835 A1 | 11/2001 | Leedom | |
| 2002/0002052 A1* | 1/2002 | McHenry | H04W 16/14 |
| | | | 455/447 |
| 2005/0159164 A1 | 7/2005 | Leedom | |
| 2008/0214231 A1 | 9/2008 | Leedom | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0088083 A1* | 4/2009 | Fujii | H04W 52/242 |
| | | | 455/69 |
| 2009/0163215 A1* | 6/2009 | Abedi | H04W 16/14 |
| | | | 455/446 |
| 2009/0163237 A1* | 6/2009 | Abedi | H04W 16/14 |
| | | | 455/501 |
| 2009/0191889 A1* | 7/2009 | Abedi | H04W 16/06 |
| | | | 455/452.1 |
| 2009/0264142 A1* | 10/2009 | Sankar | H04L 5/0007 |
| | | | 455/501 |
| 2010/0069074 A1 | 3/2010 | Kodialam et al. | |
| 2010/0097952 A1 | 4/2010 | McHenry et al. | |
| 2010/0261471 A1 | 10/2010 | Leedom | |
| 2011/0055070 A1 | 3/2011 | Stanforth et al. | |
| 2011/0231302 A1 | 9/2011 | Stanforth et al. | |
| 2011/0312368 A1* | 12/2011 | Hamdi | H04W 52/283 |
| | | | 455/522 |
| 2012/0106464 A1 | 5/2012 | Ma et al. | |
| 2012/0108179 A1* | 5/2012 | Kasslin | H04W 16/14 |
| | | | 455/67.13 |
| 2012/0142382 A1 | 6/2012 | Stanforth et al. | |
| 2012/0149364 A1 | 6/2012 | Leedom | |
| 2012/0188878 A1 | 7/2012 | Simon | |
| 2012/0202418 A1* | 8/2012 | Jalali | H01Q 1/2291 |
| | | | 455/15 |
| 2012/0302273 A1* | 11/2012 | Lin | H04W 16/14 |
| | | | 455/509 |
| 2013/0017792 A1* | 1/2013 | Miller, II | H04W 16/14 |
| | | | 455/62 |
| 2013/0021924 A1* | 1/2013 | Ericson | H04L 1/1825 |
| | | | 370/252 |
| 2013/0035124 A1* | 2/2013 | Schmidt | H04W 28/16 |
| | | | 455/501 |
| 2013/0182790 A1* | 7/2013 | Jalali | H01Q 3/24 |
| | | | 375/285 |
| 2013/0207841 A1 | 8/2013 | Negus et al. | |
| 2013/0210448 A1 | 8/2013 | Leedom | |
| 2013/0293419 A1 | 11/2013 | Negus et al. | |
| 2013/0295948 A1* | 11/2013 | Ye | H04W 72/0453 |
| | | | 455/452.1 |
| 2014/0011509 A1* | 1/2014 | Markwart | H04W 72/082 |
| | | | 455/452.1 |
| 2014/0080535 A1 | 3/2014 | Gauvreau et al. | |
| 2014/0237547 A1 | 8/2014 | Bose | |
| 2014/0248891 A1 | 9/2014 | Sennett et al. | |
| 2014/0315561 A1* | 10/2014 | Hooli | H04W 16/14 |
| | | | 455/450 |
| 2015/0036509 A1* | 2/2015 | Lopes | H04W 16/10 |
| | | | 370/241.1 |
| 2015/0087346 A1* | 3/2015 | Dahlman | H04W 16/14 |
| | | | 455/501 |
| 2015/0148054 A1* | 5/2015 | Futaki | H04W 16/14 |
| | | | 455/454 |
| 2015/0156729 A1* | 6/2015 | Sawai | H04W 16/14 |
| | | | 455/522 |
| 2015/0195844 A1* | 7/2015 | Yang | H04W 52/241 |
| | | | 455/452.2 |
| 2015/0280847 A1* | 10/2015 | Somasundaram | H04J 11/0056 |
| | | | 370/252 |
| 2015/0281971 A1* | 10/2015 | Mueck | H04W 16/14 |
| | | | 455/454 |
| 2015/0296386 A1* | 10/2015 | Menon | H04W 16/14 |
| | | | 370/241.1 |
| 2015/0296387 A1* | 10/2015 | Li | H04W 16/14 |
| | | | 455/454 |
| 2015/0304852 A1* | 10/2015 | El-Refaey | H04W 16/14 |
| | | | 455/509 |
| 2015/0358968 A1* | 12/2015 | Malladi | H04W 16/14 |
| | | | 455/454 |
| 2015/0373554 A1* | 12/2015 | Freda | H04W 16/14 |
| | | | 455/450 |
| 2016/0157103 A1* | 6/2016 | Teng | H04W 16/14 |
| | | | 370/329 |
| 2016/0183269 A1* | 6/2016 | Badic | H04B 15/00 |
| | | | 455/454 |
| 2016/0242031 A1* | 8/2016 | Ojanen | H04W 28/16 |
| 2016/0249224 A1* | 8/2016 | Prasad | H04W 16/14 |
| 2017/0099115 A1* | 4/2017 | Miller, II | H04B 15/00 |

OTHER PUBLICATIONS

Jung-Min Park et al., "Security and Enforcement in Spectrum Sharing".

Marja Matinmikko et al., "Spectrum sharing using Authorized Shared Access", WWRF workshop at ITU-R, Geneva, Switzerland on May 21, 2013.

Mohammed Altamimi et al., "Enforcement and Spectrum Sharing: Case Studies of Federal-Commercial Sharing", issued on Mar. 29, 2013.

Uen, "Spectrum Sharing" Issued on Oct. 2013.

* cited by examiner

SPECTRUM SHARING BASED ON SIGNAL-BASED SHARED ACCESS

FIELD

The present invention relates to spectrum sharing, and in particular, to spectrum sharing based on signal-based shared access (SSA).

BACKGROUND

The radio frequency (RF) spectrum is a scarce and valuable commodity. In wireless networks, data traffic demands have increased rapidly, and are growing much faster than the availability of the spectrum. Since it is hard to allocate additional spectrum bandwidth for wireless broadband, spectrum sharing concepts have been introduced. Spectrum sharing includes situations where multiple users or multiple wireless applications are authorized to use the same range of frequencies on a non-exclusive basis. Spectrum sharing is used in different types of applications, ranging from commercial wireless applications to military applications.

Spectrum can be shared in several dimensions, including the time, frequency, and spatial (geographical) domain. In some applications, a primary system requires a protection zone/distance and sets an aggregate interference threshold to protect the system. An important component of spectrum sharing is "conditions" agreed upon between key stakeholders, including the primary spectrum user, licensee (e.g., the wireless carrier), and regulator (e.g., the Federal Communications Commission (FCC)). There are several ways for a licensee to achieve access to the shared spectrum that the primary system exclusively uses under these "conditions". For example, a pilot warning beacon tone can be used at the primary system and a receiver can be used at the licensee device (or system) to monitor the presence of the pilot tone for accessing a shared frequency band. However, this implementation makes it difficult to detect and isolate interference among multiple spectrum users.

A reference signal may also be used to maintain a predetermined zone of protection for the primary system. For example, a licensee system may transmit the reference signal, such as a pilot signal, with a predetermined level of signal strength in defined frequency slots. The primary system measures the received signal strength of the reference signal and transmits this information back to the licensee system. The licensee system controls the traffic power levels such that they do not exceed the predetermined aggregate interference limit at the primary system.

However, this implementation requires protection zones for the primary system. Further, each protection zone is calculated on a per ground station (i.e., per system) basis. It may be impossible to accurately define the protection zone under all system deployment scenarios and varying RF environments by calculating an aggregate interference level. Also, even though a protection zone is set, there is no guarantee for the signal performance of the primary system.

Geolocation and timing information may also be used. For example, the shared spectrum is used by either the incumbent users or by the licensee in any given place at any given time. However, this requires pre-scheduling for sharing the band and applies restrictions on several dimensions (e.g., time, frequency, and spatial). Furthermore, this process does not always guarantee the signal performance of the primary system, and makes it difficult to detect and isolate interference among multiple spectrum users.

Thus, an alternative approach to spectrum sharing may be beneficial.

SUMMARY

Certain embodiments of the present invention may provide solutions to the problems and needs in the art that have not yet been fully identified, appreciated, or solved by current spectrum sharing techniques. For example, some embodiments generally pertain to a process for sharing spectrum based on signal-based shared access (SSA) to ensure signal performance of a primary system coexisting with neighboring licensee systems, and to provide cost-effective enforcement and monitor implementation. Certain embodiments can be configured to future industry standards in spectrum sharing between wireless communication systems, including wireless mobile communications, satellite communications, unlicensed Wi-Fi communications, etc.

In one embodiment, a process includes measuring, by a primary wireless system, a quality of a signal of interest (SOI) over a shared spectrum band. The process also includes transmitting, from the primary wireless system, a quality indicator, which is related to an associated action message, to a second wireless system.

In another embodiment, a process includes transmitting, from a primary wireless system, a quality indicator, which is related to an associated action message, for a shared spectrum band to a second wireless system. The process also includes receiving, at the primary wireless system, spectrum usage information from the second wireless system. The process further includes determining, by the primary wireless system, whether the second wireless system complies with spectrum sharing band conditions between the primary wireless system and the second wireless system.

In yet another embodiment, a system includes a primary wireless system configured to share a spectrum band with one or more secondary wireless systems. The primary wireless system measures a quality of a SOI between a ground station and a satellite downlink over a shared spectrum band. The primary wireless system transmits a signal quality indicator to the one or more secondary wireless systems. The one or more secondary wireless systems receive the signal quality indicator from primary wireless system, and apply interference mitigation (or avoidance) techniques to avoid harmful interference with the primary wireless system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to spectrum sharing to allow multiple communication systems to coexist. Signal performance may be measured in a primary wireless communications system, and the signal performance information may be sent to a licensee wireless communications systems for sharing optimization. A violation of a predetermined agreement may be enforced by receiving the necessary information from licensee wireless communications systems. This ensures the primary system's performance while providing a cost-efficient and harmonized way to monitor and enforce the licensee wireless communication systems. This process not only applies between the primary system and secondary licensee wireless communication system, but also between the primary system and any other licensee/unlicensed systems to share the spectrum (or RF) band.

Figure 1:
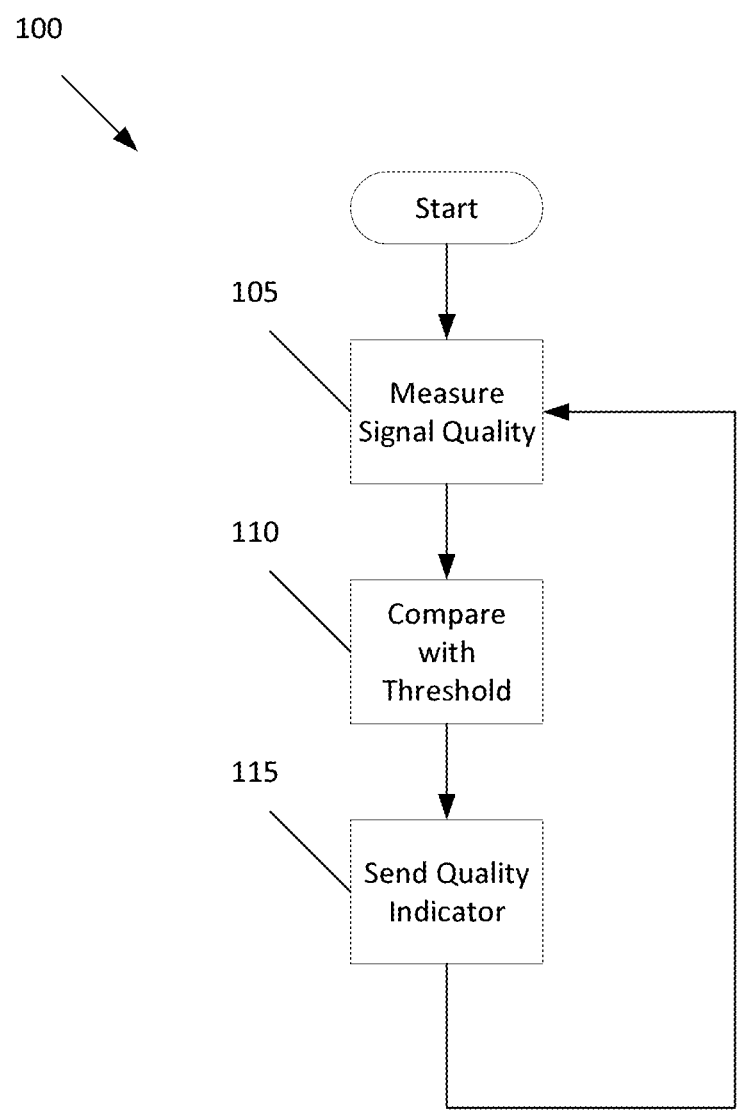
FIG. 1 is a flow diagram illustrating a process for spectrum sharing based on SSA, according to an embodiment of the present invention.
Figure 2:
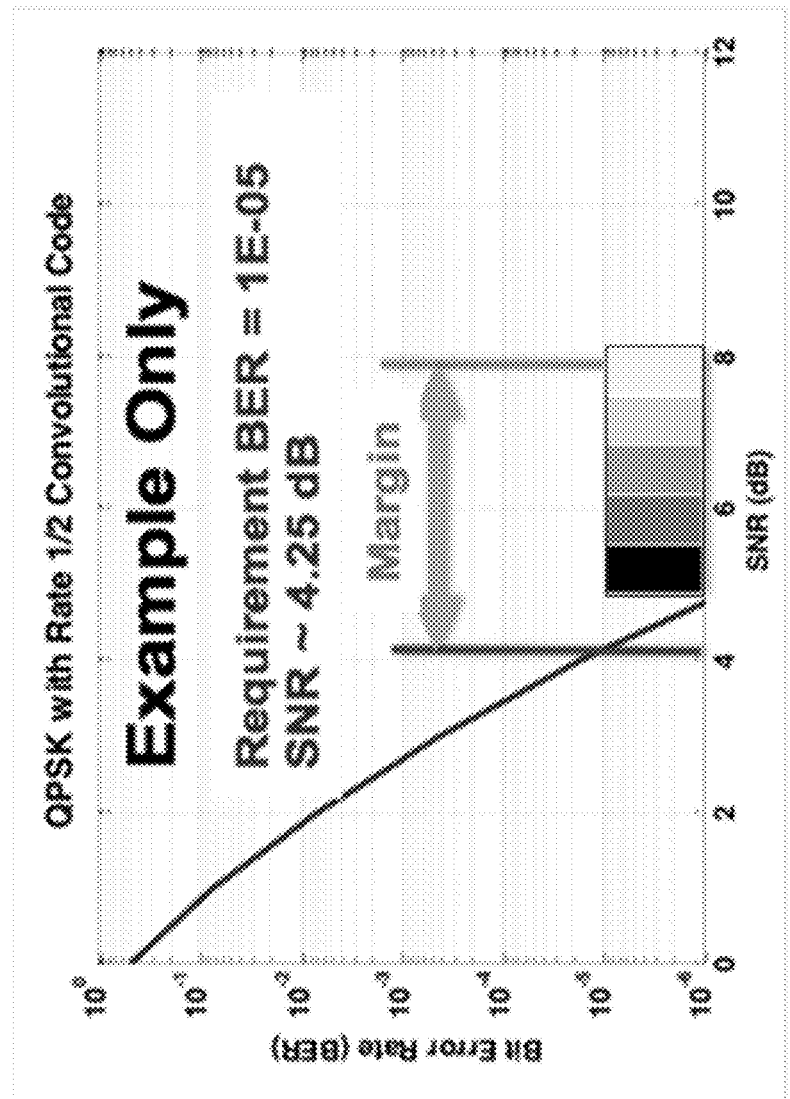
FIG. 2 is a graph illustrating a signal-to-noise ratio (SNR) using an error vector magnitude (EVM), according to an embodiment of the present invention

FIG. 1 is a flow diagram 100 illustrating a process for spectrum sharing based on SSA, according to an embodiment of the present invention. In this embodiment, the process begins at 105 with a primary system measuring a signal quality with a satellite downlink, for example. At 110, the primary system compares the signal quality with a minimum threshold level (e.g., a performance link margin or any other type of threshold level), which can relate to the system's performance. See, for example, FIG. 2, which is a graph 200 illustrating a SNR using an EVM, according to an embodiment of the present invention. Graph 200 shows an example of a signal quality indicator with a performance margin. It should be appreciated that the EVM, channel bit error rate (BER), and/or symbol error rate (SER) can be used as input parameters of the signal quality indicator. Furthermore, the signal quality indicator can be set differently for each system.

Figure 3:
FIG. 3 is a chart illustrating a notional signal quality indicator, which is related to an associated action message, according to an embodiment of the present invention.

Returning to FIG. 1, at 115, the primary system transmits a message to the licensee. The licensee in some embodiments may be a wireless carrier. The transmitted message includes a signal quality indicator, which is related to an associated action message. In certain embodiments, the associated action message can be determined and agreed upon between the key stakeholders. The signal quality indicator may be represented as colors, numerals, letters, or any combination thereof. The action message, which corresponds to the signal quality indicator, represents desired level of action required by the primary system. See, for example, FIG. 3, which includes a chart 300 illustrating a signal quality indicator and action message, according to an embodiment of the present invention. In this embodiment, chart 300 shows quality indicators 1-5 and the actions associated with the respective quality indicators. For example, if the quality indicator is 5, the action sent to the wireless carrier is benign, i.e., no action is needed ("use the spectrum"). If the quality indicator is 2, the action message sent to the wireless carrier is critical, i.e., the wireless carrier can still use the spectrum band, but interference mitigation (or avoidance) techniques should be applied to their systems in an attempt to avoid or prevent harmful interference with the primary system. If, however, the quality indicator is 1, the action sent to the wireless carrier is "do not use the spectrum." This essentially notifies the wireless carrier that the user equipment (or wireless system) needs to stop using the spectrum band. Simply stated, the signal quality indicator may inform the wireless carrier of the signal quality of the primary system. It should be appreciated that the wireless system may be notified instead of, or along with, the user equipment in certain embodiments.

Based on the signal quality indicator, the wireless carrier may perform certain actions. These actions may include, but are not limited to, reducing a power level of user equipment operating in the wireless carrier, switching the user equipment from operating under the shared spectrum band to operating under another spectrum band, or continue to use the shared spectrum band. A person of ordinary skill in the art will appreciate that other actions may be performed by the wireless carrier to ensure that the wireless carrier does not interfere with the signal quality of the primary system.

Figure 4:
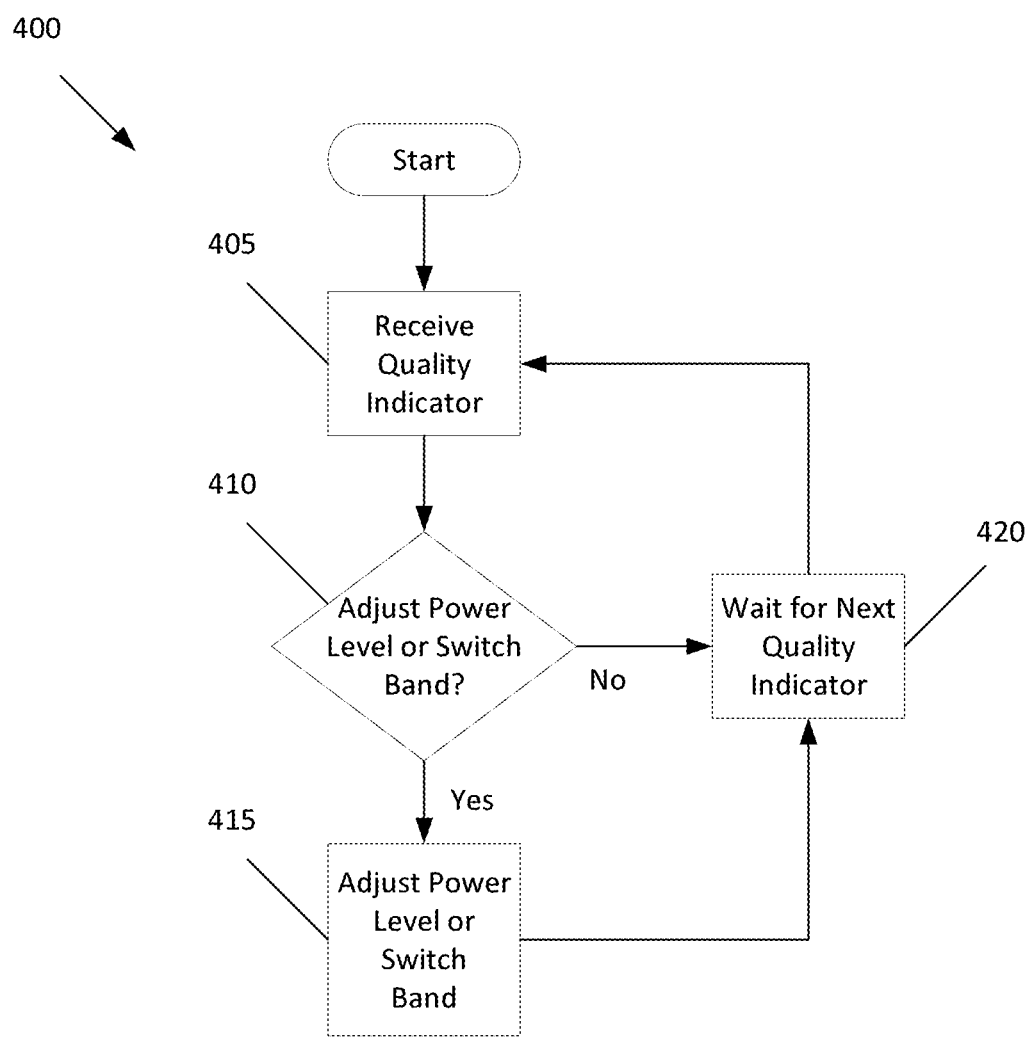
FIG. 4 is a flow diagram illustrating a process for adjusting the power level of user equipment (or systems), according to an embodiment of the present invention.

FIG. 4 is a flow diagram 400 illustrating a process for adjusting the power level interference mitigation (or avoidance) techniques of the wireless carrier, according to an embodiment of the present invention. This process begins at 405 with the licensee receiving the quality indicator from the primary system. At 410, the licensee determines whether to adjust the power level of the user equipment based on the quality indicator received from the primary system or switch to another spectrum band. If the licensee determines that the power level should be adjusted or should be switched to another spectrum band, then at 415 the licensee adjusts the power level for the user equipment, or switches the user equipment to another spectrum band. If the licensee determines that the power level does not need to be adjusted or does not need to change the spectrum band, then the process continues to step 420 and waits for the next quality indicator.

The processes shown in FIGS. 1 and 4 provide a balance between spectrum exclusivity and spectrum resource utilization. For instance, because a secondary system can use the spectrum during periods where the quality indicator is greater than one, the licensee is allowed to utilize the spectrum. This results in an increase in spectrum utilization. This also allows the licensee to gain additional capacity relative to existing protection zone based spectrum sharing approaches.

While the processes shown in FIGS. 1 and 4 appear to apply to user equipment of a wireless carrier, the processes shown in FIGS. 1 and 4 may also apply to wireless system(s), user equipment, or both.

Figure 5:
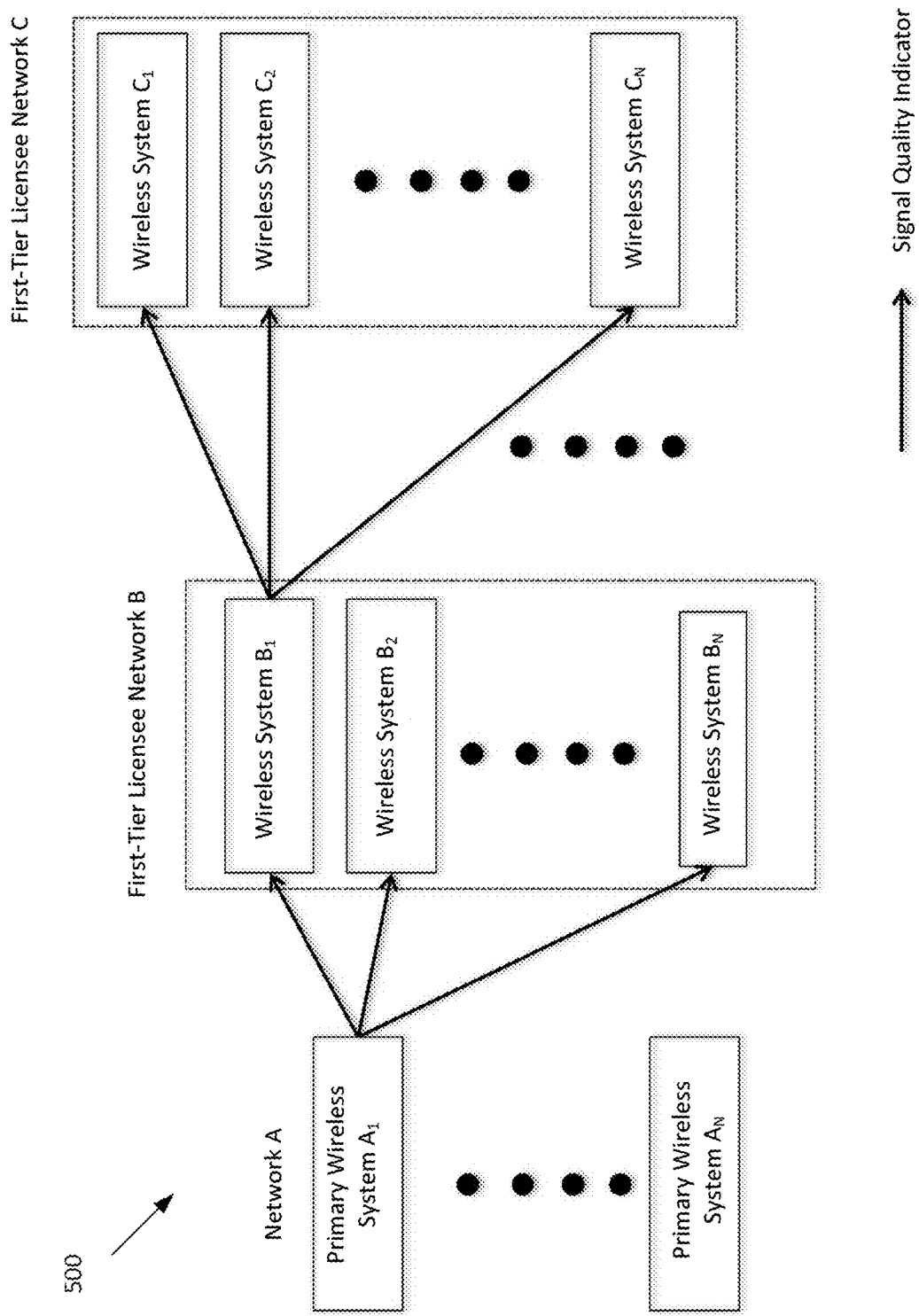
FIG. 5 is a block diagram illustrating a tiered concept for spectrum sharing, according to an embodiment of the present invention.

FIG. 5 is a block diagram 500 illustrating a tiered concept for spectrum sharing, according to an embodiment of the present invention. In this embodiment, network A licenses the use of a spectrum band to network B (First-Tier Licensee), and network B sublicenses the use of the spectrum band to network C (Second-Tier Licensee). It should be appreciated that there may be any number n of sub-licensees. It should also be appreciated that network A may include a plurality of wireless systems $A_1, A_2, \ldots A_n$, network B may include a plurality of wireless systems $B_1, B_2, \ldots B_n$, and network C may include a plurality of wireless systems $C_1, C_2, \ldots N_n$.

The spectrum sharing diagram shown in FIG. 5 allows network B to be an authorized spectrum access licensee, and network C to also be an authorized spectrum access sub-licensee. In this embodiment, network A may send information, such as a signal quality indicator, to network B. Similarly, network B may also able to send the information, such as the signal quality indicator, to network C. It should be appreciated that depending on the embodiment, the tiered networks B . . . N may use the signal quality indicator of network A or each use its own signal quality indicator to notify sub-licensees. In embodiments where tiered networks $B_1 \ldots B_N$ use their own signal quality indicator to notify their respective sub-licensees, such signal quality indicators may be defined in a different way. For example, if wireless system $A_1$ sends a signal quality indicator of level 3 to wireless systems $B_1 \ldots B_N$, then wireless system $B_1$ may use its own signal quality indicator of level 2 for any sub-licensees (e.g., wireless systems $C_1 \ldots C_N$).

Figure 6:
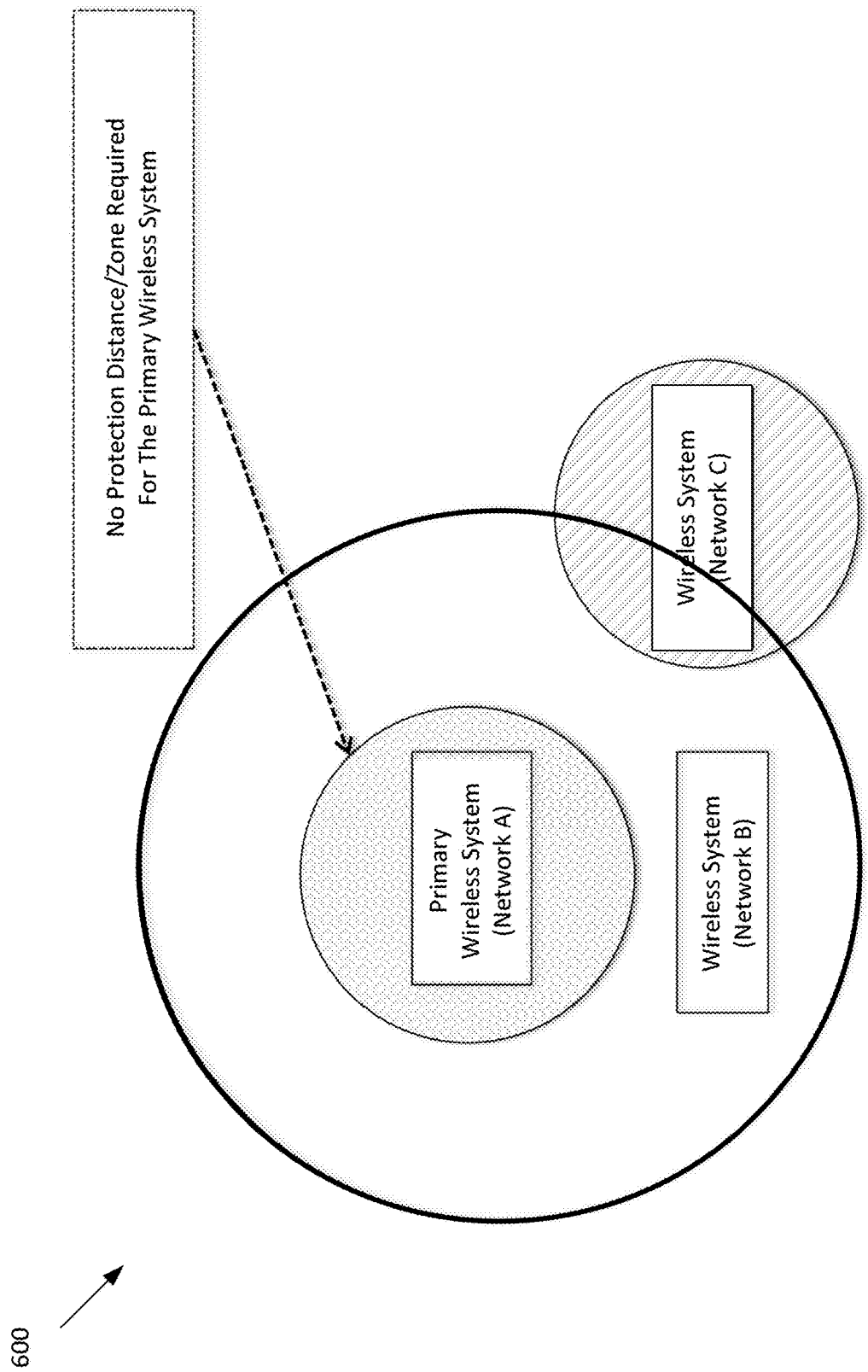
FIG. 6 is a schematic diagram illustrating spectrum sharing among multiple networks, according to an embodiment of the present invention.

FIG. 6 is a schematic diagram 600 illustrating spectrum sharing among multiple networks, according to an embodiment of the present invention. In particular, FIG. 6 shows how spectrum sharing can be applied to a geographical area among multiple network systems without a protection zone. For example, network A does not require a protection zone or distance in this embodiment to protect the primary wireless system. Instead, implementing the spectrum sharing process discussed herein allows multiple networks, such as network B, to overlap in coverage with network A as long as the signal quality is not degraded. Therefore, the licensees can further utilize this spectrum band, which results in an increase in spectrum utilization in the given geographical area. A resultant benefit is that the licensees are able to gain additional network capacity. The same would apply to any sub-licensee (e.g., network C) of the licensee (e.g., network B).

Figure 7:
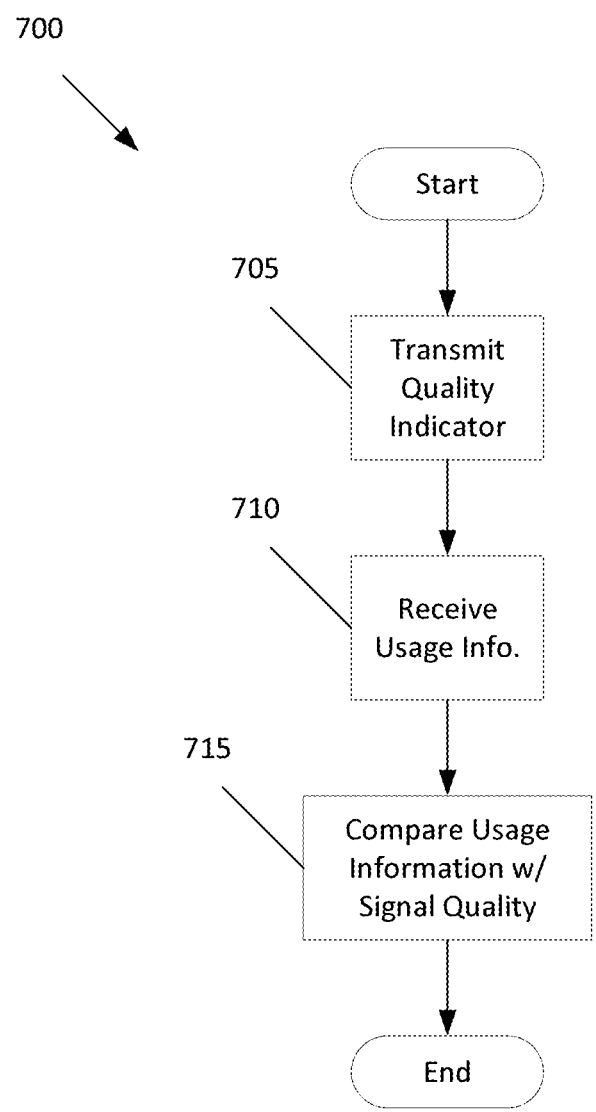
FIG. 7 is a flow diagram illustrating a process for enforcing spectrum sharing, according to an embodiment of the present invention.

FIG. 7 is a flow diagram 700 illustrating a process for enforcing spectrum sharing, according to an embodiment of the present invention. In this embodiment, the process begins at 705 with the primary system, for example, transmitting a signal quality indicator to the licensee. At 710, the primary system receives spectrum usage information from the licensee, and at 715, the primary system compares the spectrum usage information with the signal quality indicator to determine whether the licensee system is complying with the agreement between primary system and licensee system. The same process may be implemented between the licensee and any sub-licensee in some embodiments.

Figure 8:
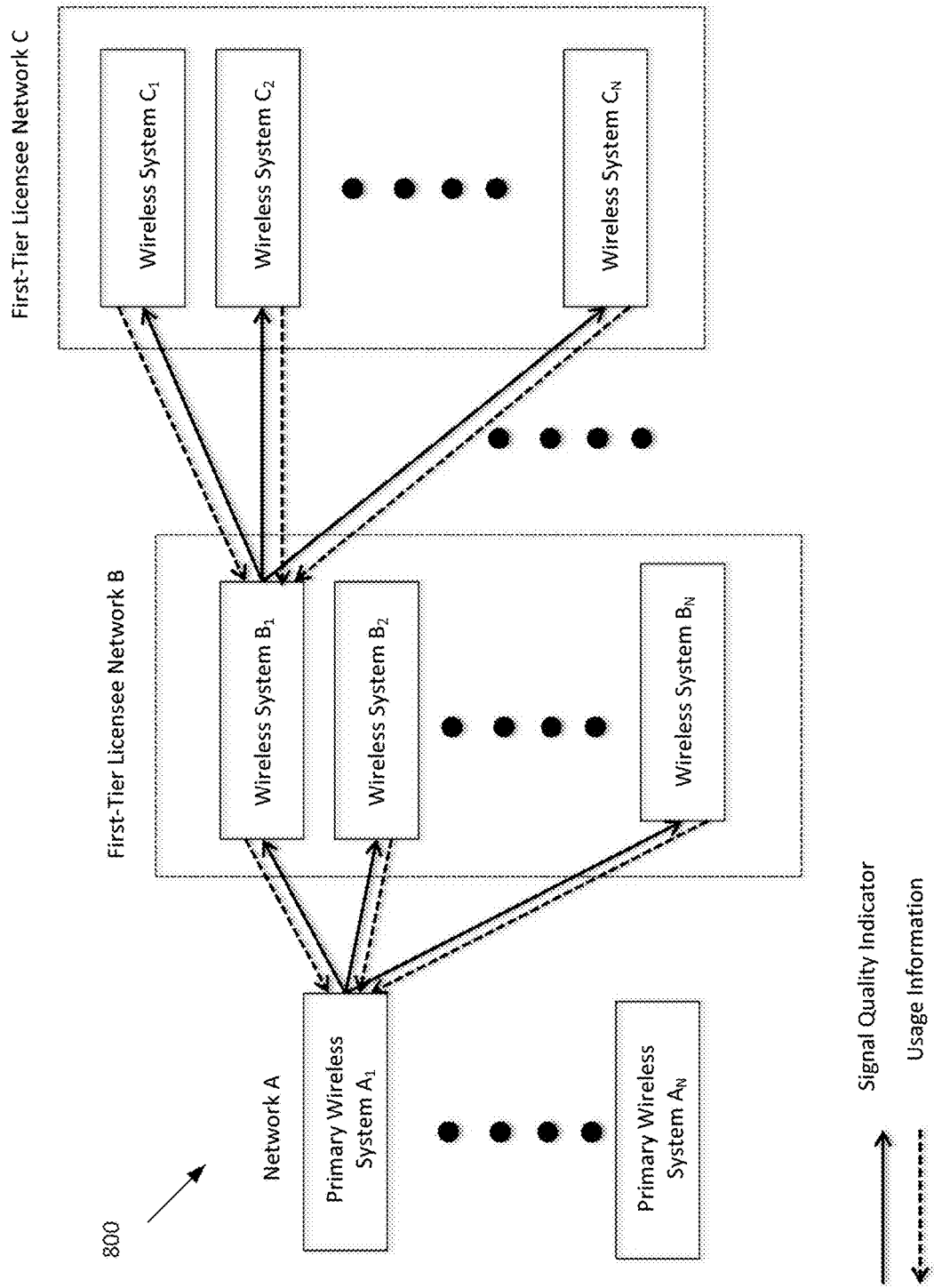
FIG. 8 is a block diagram illustrating a tiered concept for extended spectrum sharing based on SSA and enforcement, according to an embodiment of the present invention.

FIG. 8 is a block diagram 800 illustrating a tiered concept for extended spectrum sharing based on SSA and enforcement, according to an embodiment of the present invention. In some embodiments a primary system operator may need to prevent harmful interference from licensee or any sub-licensee. For this reason, it may be beneficial to implement a monitoring and detecting process allowing the primary system to control and enforce the licensee in case of violation of a predetermined agreement. In this embodiment, bi-directional exchange of information is shown in FIG. 8 between network A (primary systems), first-tier licensee network B, and second-tier licensee network C. For example, network A may transmit a signal quality indicator to network B, and network B may transmit the same or a modified signal quality indicator to network C. For enforcement purposes, network C may transmit spectrum usage information to network B, and network B may determine whether network C complies with the agreement between network B and network C. Similarly, network B may transmit spectrum usage information to network A, and network A may determine whether network B complies with the agreement between network A and network B.

Simply put, the embodiment shown in FIG. 8 allows network B to confirm whether network C is operating in accordance with the agreement by looking at the spectrum usage information of network C. Similarly, network A may confirm whether network B is operating in accordance with the predetermined agreement by looking at the spectrum usage information of network B.

Figure 9:
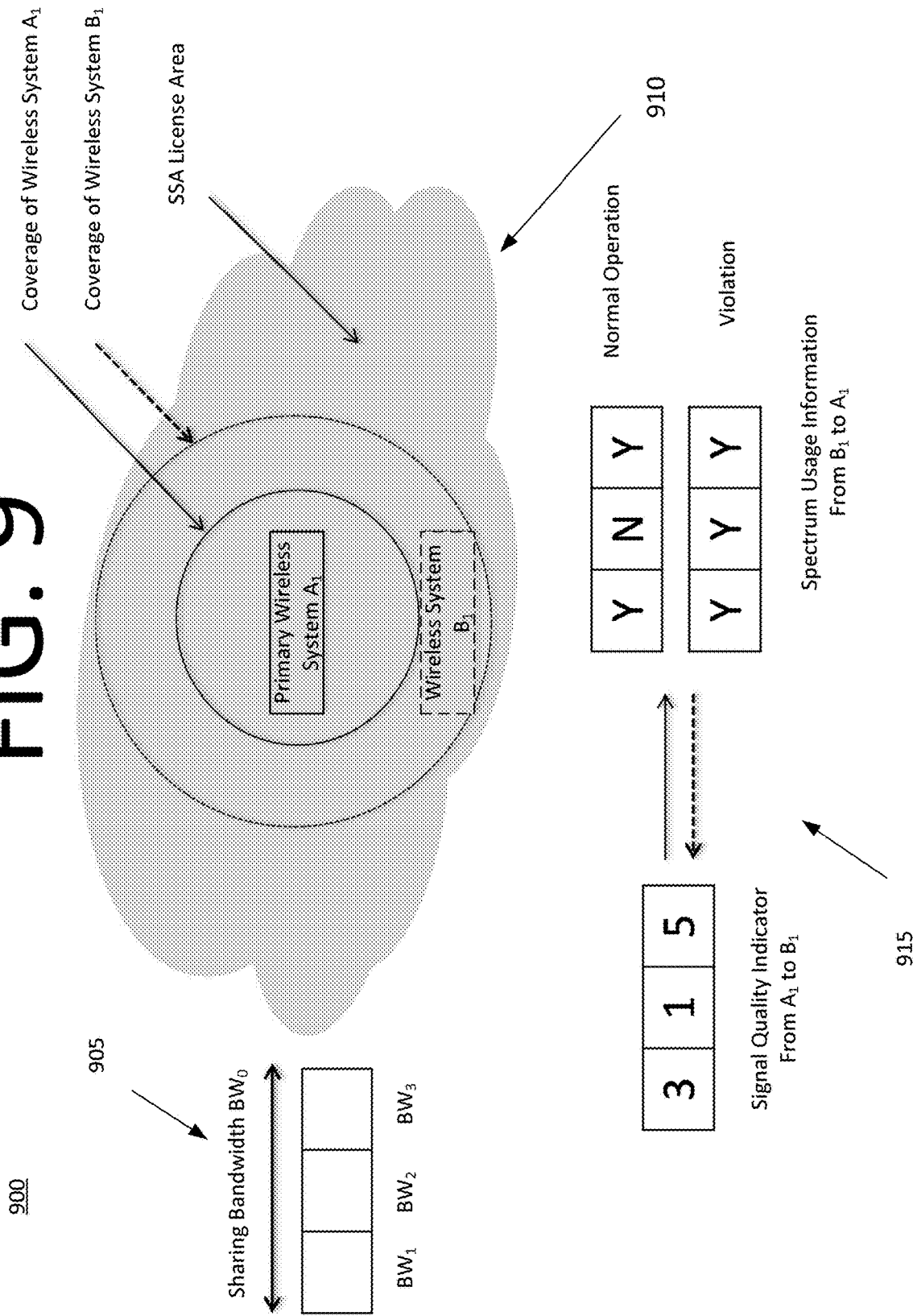
FIG. 9 illustrates extended spectrum sharing based on SSA and notional enforcement, according to an embodiment of the present invention.

FIG. 9 illustrates extended spectrum sharing based on SSA and notional enforcement, according to an embodiment of the present invention. In this embodiment, coverage 910 of wireless system $A_1$ and the coverage of wireless system $B_1$ are shown. Also shown is a SSA license area. Assuming that wireless system $A_1$ transmits a signal quality indicator of 1 to wireless system $B_1$, then wireless system $B_1$ should take any actions not to cause harmful interference with wireless system $A_1$ (e.g., wireless system $B_1$ may switch to use another spectrum band). See, for example, sharing bandwidth $B_0$ of item 905 of FIG. 9, which includes three sub-frequency blocks $BW_1$, $BW_2$, $BW_3$. In FIG. 9, for example, wireless system $A_1$ transmits signal quality indicator values 3, 1, and 5 in $BW_1$, $BW_2$, and $BW_3$, respectively. See item 915 of FIG. 9. The primary system $A_1$ can use spectrum sharing based on SSA and enforcement over entire frequency band $BW_0$, or individual sub-frequency blocks $BW_1$, $BW_2$, $BW_3$. The spectrum sharing based on sub-frequency blocks $BW_1$, $BW_2$, $BW_3$ by primary system $A_1$, can further increase the spectrum efficiency of wireless system $B_1$ in the SSA licensee area.

To ensure that wireless system $B_1$ is in compliance, wireless system $B_1$ transmits spectrum usage information to wireless system $A_1$ upon receipt of the signal quality indicator. Spectrum usage information may include usage information associated with the entire shared frequency band $BW_0$ or for each individually shared sub-frequency block $BW_1$, $BW_2$, $BW_3$. Wireless system Ai monitors each sub-frequency block to determine whether wireless system $B_1$ violates the agreement between wireless system $A_1$ and wireless system $B_1$. In the example shown in FIG. 9, wireless system $A_1$ transmits a signal quality indicator of 1 in sub-frequency block $BW_2$, and in response, wireless system $B_1$ transmits usage information to wireless system $A_1$. Wireless system $A_1$ monitors sub-frequency block $BW_2$ in this example to determine whether wireless system $B_1$ is in violation of the agreement. For example, if spectrum usage information for sub-frequency block $BW_2$ includes a 'Y', then a violation is occurring. If, however, $BW_2$ includes 'N', then wireless system $B_1$ is in compliance with the agreement. In other words, the 'Y' or 'N' in sub-frequency block $BW_2$ shows the presence of a signal of the licensee, in this case, wireless system $B_1$. The spectrum usage information in certain embodiments may be represented as colors, numerals, letters, or any combination thereof.

Figure 10:
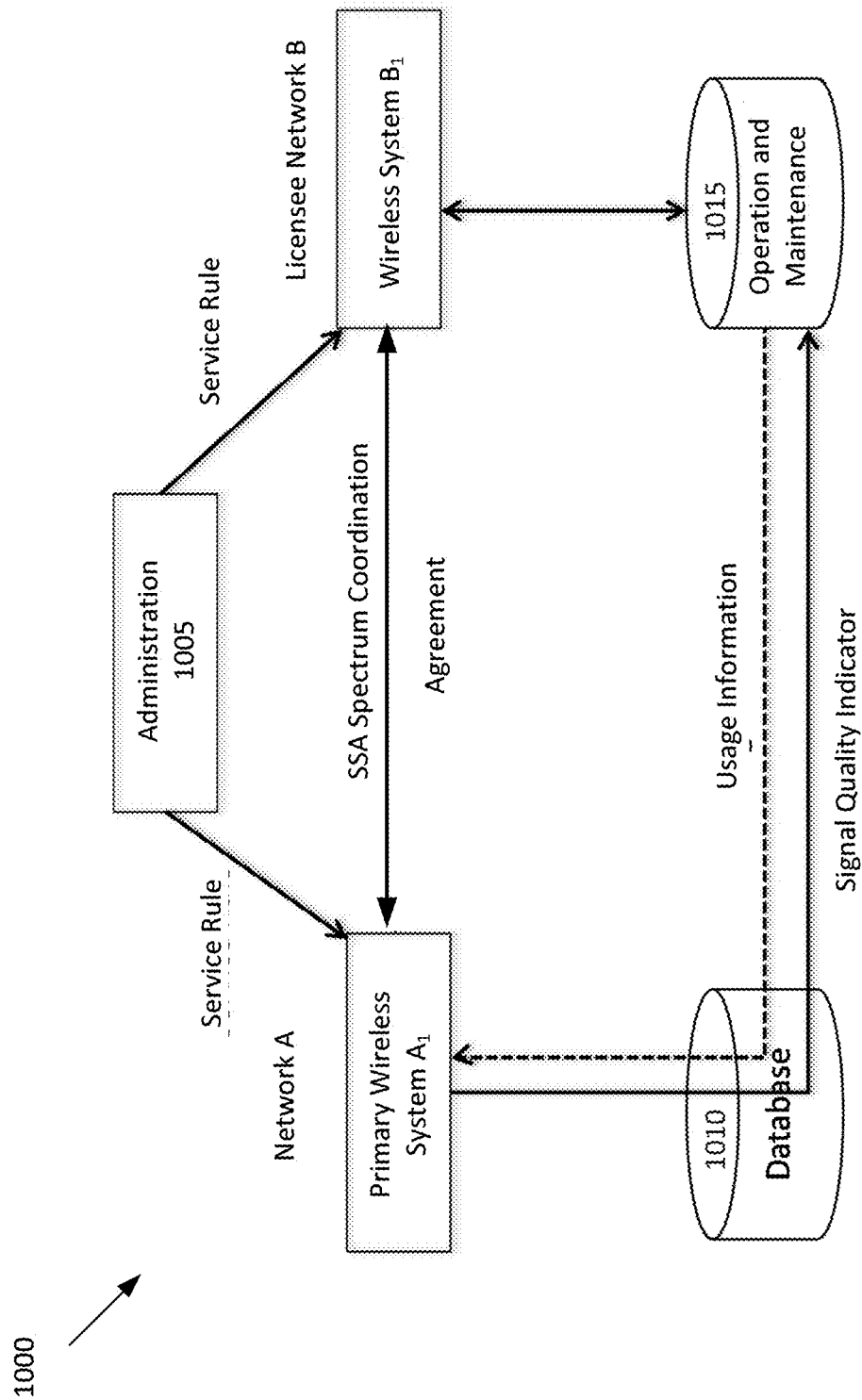
FIG. 10 is a block diagram illustrating a regulatory system for spectrum sharing based on SSA, according to one embodiment of the present invention.

FIG. 10 is a block diagram 1000 illustrating a regulatory system for spectrum sharing based on SSA, according to one embodiment of the present invention. In this embodiment, block diagram 1000 includes primary wireless system Ai (network A) and wireless system $B_1$ (licensee network B), an administrator 1005, a database 1010, and an operation and maintenance center 1015.

In this embodiment, bi-directional information (e.g., signal quality information and spectrum usage information) is exchanged between network A and licensee network B. In particular, bi-directional information is exchanged through database 1010 of network A and operation and maintenance center 1015 of licensee network B. Database 1010 may be owned by the owner of network A, a third party, or shared between owners of network A and licensee network B in some embodiments. Database 1010 may be populated with technical information such as satellite information, ground station information, wireless system information, technical sharing conditions, regulatory policies, etc.

In this embodiment, the operations and maintenance (O&M) center 1015 performs management of the SSA licensed spectrum. O&M center 1015 retrieves the quality indicator information from database 1010, and translates the quality indicator information into Radio Resource Management (e.g., in the eNodeB, base station, etc.) in the SSA licensee's network. Based on this information, the licensee's network, e.g., licensee network B, may enable the user equipment (or system) to use the SSA shared spectrum or switch to another spectrum band when it becomes necessary. O&M center 1015 also sends the spectrum usage information from the licensee's network to database 1010. Administration 1005 is a national regulatory body in this embodiment, and is responsible for granting licenses and negotiating sharing conditions on regional basis. The regulator will determine a set of rules with the parties involved for the practical implementation of spectrum sharing under the SSA spectrum coordination agreement. Administration 1005 may be the National Telecommunications and Information Administration (NTIA) or the Federal Communications Commission (FCC) in some embodiments.

The processes shown in FIGS. 1, 4, and 7 may be performed, in part, by a computer program, encoding instructions for a nonlinear adaptive processor to cause at least the processes described in FIGS. 1, 4, and 7 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 1, 4, and 7, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Embodiments of the present invention pertain to spectrum sharing based on SSA, SSA based monitoring and enforcement, and a regulatory architecture for spectrum sharing and SSA based monitoring and enforcement. In one embodiment, spectrum sharing based on SSA includes sending, from the primary system, information to licensee wireless communications system(s) for sharing optimization. This information may include a signal quality indicator measured in the physical layer of the primary system. New or existing communication links may be required in order to transmit the information to the licensee wireless communications system(s).

In another embodiment, SSA based monitoring and enforcement includes sending a signal quality indicator from the primary system to the licensee wireless communications system(s). Spectrum usage information is received from the licensee wireless communications system(s) to determine whether the licensee wireless communications system(s) is in violation of an agreement between the primary system(s) and the licensee wireless communications system(s). This eliminates the need for a primary system to implement a protection zone, especially in a dense urban area.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for sharing a spectrum, comprising:
  measuring, by a primary wireless system, a quality of signal of interest of the primary wireless system over an entire spectrum band while one or more secondary wireless systems are using all or a portion of the entire spectrum band owned by the primary wireless system, wherein the quality of the signal of interest comprising a signal quality performance in a physical layer of the primary wireless system;
  comparing the quality of the signal of the primary wireless system with a minimum threshold level of the primary wireless system to determine a signal quality indicator;
  upon measuring and comparing of the quality of the signal, transmitting, from the primary wireless system, the signal quality indicator of the primary wireless system to the one or more secondary wireless systems irrespective of a level or value of the signal quality indicator; and
  receiving, by the primary wireless system, spectrum usage information from the one or more secondary wireless systems to ensure that the one or more secondary wireless systems comply with an agreement between the primary wireless system and the one or more secondary wireless systems, wherein
  the signal quality indicator is related to an associated action message, wherein the associated action message represents a desired level of action required by the primary wireless system,
  the primary wireless system is the owner of the entire spectrum band in a primary network and licenses use of all or a portion of the entire spectrum band to the one or more secondary wireless systems eliminating a protection zone or exclusion zone, and
  the secondary wireless system is a licensee of the primary wireless system and is able to overlap in coverage with the primary wireless system so long as the quality of the signal of interest for the primary wireless system is acceptable.

2. The process of claim 1, wherein the signal quality indicator identifies a signal quality level of the primary wireless system.

3. The process of claim 1, wherein the associated action message corresponds to the signal quality indicator.

4. The process of claim 3, wherein the desired level of action comprises a benign action, a good signal level indicator, a caution warning, a critical warning, or a do not use spectrum warning.

5. The process of claim 1, further comprising:
  comparing, by the primary wireless system, the spectrum usage information with the signal quality indicator to determine whether the one or more secondary wireless systems comply with spectrum sharing band conditions between the primary wireless system and the one or more secondary wireless system.

6. The process of claim 1, wherein the entire spectrum band comprises one or more sub-frequency blocks.

7. The process of claim 6, wherein the transmitting of the signal quality indicator further comprises transmitting the signal quality indicator for the one or more sub-frequency blocks.

8. A process for sharing a spectrum, comprising:
  receiving, at a secondary wireless system, a signal quality indicator of a primary wireless system over an entire spectrum band or for one or more shared sub-frequency blocks of the spectrum band while the secondary wireless system is using the entire spectrum band or the one or more shared sub-frequency blocks within the entire spectrum band, wherein the signal quality indicator of the primary wireless system is related to a signal quality performance in a physical layer of the primary wireless system;
  transmitting, by the secondary wireless system, spectrum usage information to ensure that the secondary wireless system is complying with an agreement between the primary wireless system and the second wireless system; and
  based on the signal quality indicator,
  adjusting, by the secondary wireless system, a power level of user equipment or one or more wireless systems operating under the spectrum band,
  switching the user equipment or the secondary wireless system from operating under the entire spectrum band or the one or more shared sub-frequency blocks within the entire spectrum band to operate under another spectrum band outside of the entire spectrum band not owned by the primary wireless system, or
  maintain the power level of the user equipment or the secondary wireless system to continue to operate under the entire spectrum band, wherein
  the primarily wireless system is the owner of the entire spectrum band in a primary network and licenses use of the entire spectrum band or the one or more shared sub-frequency blocks within the entire spectrum band to the secondary wireless system eliminating a protection zone or exclusion zone, and
  the secondary wireless system is a licensee of the primary wireless system and is able to overlap in coverage with the primary wireless system so long as the quality of the signal of interest for the primary wireless system is acceptable, and
  the signal quality indicator is related to an associated action message, wherein the associated action message represents a desired level of action required by the primary wireless system.

9. The process of claim 8, wherein the signal quality indicator comprises a signal quality level of the primary wireless system.

10. The process of claim 8, wherein
  the associated action message corresponds to the signal quality indicator.

11. The process of claim 8, further comprising:
  transmitting, by the secondary wireless system, spectrum usage information of the secondary wireless system to a primary wireless system for the entire spectrum band or for the one or more shared sub-frequency blocks within the entire spectrum band.

12. The process of claim 8, further comprising:
  transmitting, by the secondary wireless system, the signal quality indicator to one or more tertiary wireless systems.

13. The process of claim 8, further comprising:
  transmitting, by the secondary wireless system, a redefined signal quality indicator to one or more tertiary wireless systems.

14. The process of claim 8, further comprising:
receiving, by the secondary wireless system, spectrum usage information from the one or more tertiary wireless systems.

15. The process of claim 14, further comprising:
comparing, by the secondary wireless system, the spectrum usage information with the signal quality indicator or a redefined signal quality indicator to determine whether the one or more tertiary wireless systems comply with spectrum sharing conditions between the secondary wireless system and the one or more tertiary wireless systems.

16. A system, comprising:
a primary wireless system configured to share a spectrum band with one or more secondary wireless systems, wherein
the primary wireless system is configured to:
measure a quality of a signal of interest of the primary wireless system over an entire spectrum band while one or more secondary wireless systems are using the spectrum band owned by the primary wireless system, wherein the quality of the signal of interest comprising a signal quality performance in a physical layer of the primary wireless system,
comparing the quality of the signal of the primary wireless system with a minimum threshold level of the primary wireless system to determine a signal quality indicator,
upon measuring and comparing of the quality of the signal, transmit the signal quality indicator of the primary wireless system to the one or more secondary wireless systems irrespective of a level or value of the signal quality indicator, and
receiving, by the primary wireless system, spectrum usage information from the one or more secondary wireless systems to ensure that the one or more secondary wireless systems comply with an agreement between the primary wireless system and the one or more secondary wireless systems; and
the one or more secondary wireless systems are configured to:
receive the signal quality indicator from the primary wireless system, and
apply interference mitigation techniques to avoid harmful interference with the primary wireless system, wherein
the primary wireless system is the owner of the entire spectrum band in a primary network and licenses use of the spectrum band to the one or more secondary wireless systems eliminating a protection zone or exclusion zone, and
the one or more secondary wireless systems are licensees of the primary wireless system and is able to overlap in coverage with the primary wireless system so long as the quality of the signal of interest for the primary wireless system is acceptable, and
the signal quality indicator is related to an associated action message, wherein the associated action message represents a desired level of action required by the primary wireless system.

17. The system of claim 16, wherein the mitigation techniques comprise:
adjusting a power level of user equipment or one or more wireless systems operating under the shared spectrum,
switching the user equipment or the one or more wireless systems from operating under the shared spectrum band to operate under another spectrum band, and/or
maintaining a power level of the user equipment or the one or more wireless systems to operate under the shared spectrum band.

18. The system of claim 16, wherein the one or more secondary wireless systems are configured to transmit the spectrum usage information to the primary wireless system when the signal quality indicator is received.

19. The system of claim 18, wherein the primary wireless system is configured to monitor the spectrum usage information to determine whether the one or more secondary wireless systems comply with spectrum sharing band conditions between the primary wireless system and the one or more secondary wireless systems.

* * * * *